United States Patent
Henry et al.

[15] 3,707,298
[45] Dec. 26, 1972

[54] SUSPENSION STRUCTURE FOR LAND VEHICLES

[72] Inventors: O. Lee Henry; William C. Pierce, both of Muskegon, Mich.

[73] Assignee: Lear Siegler, Inc., Santa Monica, Calif.

[22] Filed: Oct. 6, 1970

[21] Appl. No.: 78,364

[52] U.S. Cl. ................280/124 R, 267/15, 267/52
[51] Int. Cl. .............................................B60g 7/04
[58] Field of Search ........280/124; 267/21, 35, 57.1, 267/52

[56] References Cited

UNITED STATES PATENTS

| | | |
|---|---|---|
| 2,907,579 | 10/1959 | Masser................................280/124 R |
| 3,437,347 | 4/1969 | Hickman ...........................267/21 R |
| 2,692,135 | 10/1954 | Crane......................................267/52 |
| 1,575,118 | 3/1926 | Lipcot.....................................267/52 |
| 3,332,701 | 7/1967 | Masser...............................267/15 A |

Primary Examiner—Philip Goodman
Attorney—Barnes, Kisselle, Raisch & Choate

[57] ABSTRACT

Lateral projection on each end of an axle is rockable under torsion forces within a receptacle on each of two vertically swinging control arms. Rocking is yieldably resisted by elastomer material between the end of the projection and bottom of the receptacle. The projection end is curved to provide greater elastomer thickness where greatest deflection occurs. Apposed sides of projection and receptacle interengage to limit the range of rocking movement.

10 Claims, 5 Drawing Figures

PATENTED DEC 26 1972

INVENTORS
O. LEE HENRY
WILLIAM C. PIERCE
BY
Barnes, Kisselle, Raisch & Choate
ATTORNEYS

SUSPENSION STRUCTURE FOR LAND VEHICLES

This invention relates generally to suspensions for land vehicles and more particularly to a mounting or attachment between the vehicle axle and the components of the suspension which secure the axle in load-bearing relation to the vehicle frame.

This invention represents an improvement over Masser U.S. Pat. No. 2,907,579 wherein a block or pad of elastomer material is inserted between a lateral projection on the axle and a receptacle anchored to a control arm or other component of the suspension secured to the vehicle frame. The elastomer pad yieldably resists rocking of the axle within the receptacle responsive to torsional forces such as brake or drive forces on the axle.

This suspension has enjoyed great commercial success over the years, but it has been found that the elastomer material tends to fail before other components of the suspension. We have discovered that a principal reason for such failure is that the vehicle axle is subjected to torsional forces not only as a result of braking and driving torque but also as a result of diagonal axle walk relative to the vehicle frame which occurs when the wheels at the opposite ends of the axle encounter unlike irregularities in a road or off-the-road surface and conversely when the vehicle frame tilts or rolls relative to the axle. In short, the axle is continually subjected to varying torsional forces during operation, thereby hastening fatigue and failure of the elastomer material.

The primary object of the present invention is to provide a relatively simple, inexpensive axle mounting or attachment improved to lengthen the life of the elastomer material and also to provide improved roll resistance of the vehicle.

In general, the invention is carried out by providing the end face on the axle projection with a rounded contour such that the elastomer thickness is greatest where the greatest distortion or deflection thereof occurs, thereby diminishing the percentage of distortion of the material and increasing its life. In addition, the axle projection and its receptacle are dimensioned and contoured so that the apposed sides thereof bottom out to limit the extent of elastomer distortion and increase the roll resistance of the vehicle.

One form of the invention is shown in the accompanying drawings.

Figure 1:
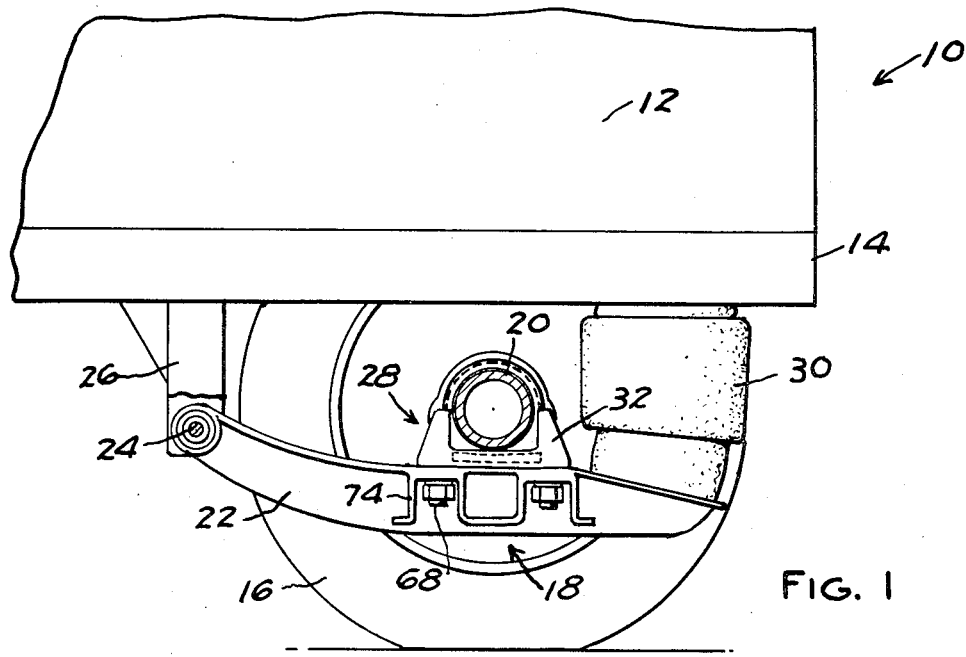
FIG. 1 is a generally side elevational view of a portion of a vehicle having a suspension which incorporates the present invention, parts being shown in section and in phantom to illustrate structural details.
Figure 2:
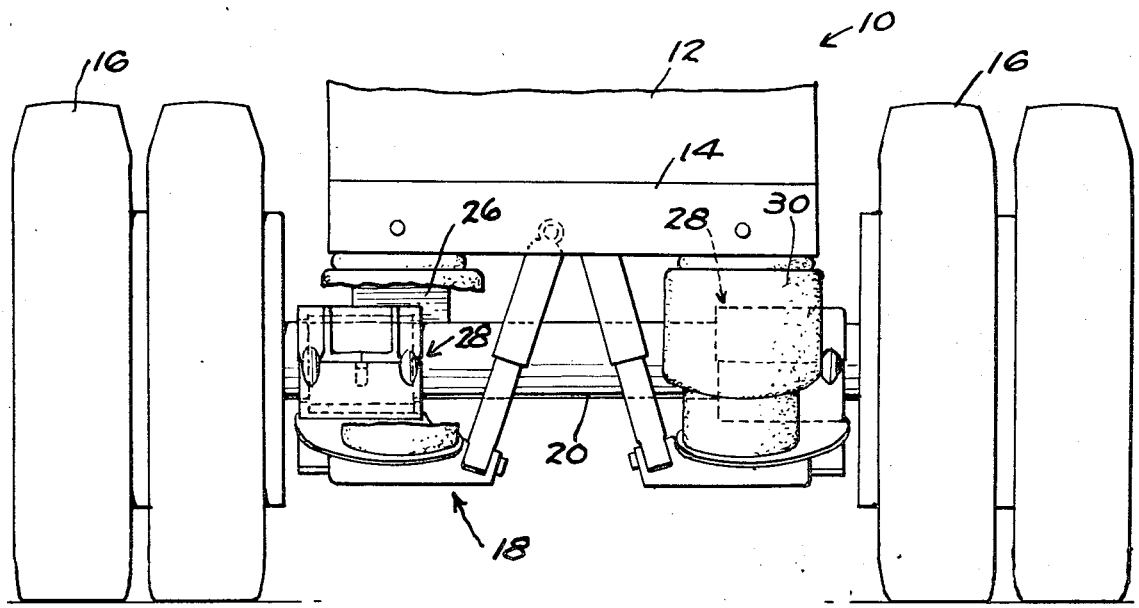
FIG. 2 is a generally end elevational view of the vehicle shown in FIG. 1.
Figure 3:
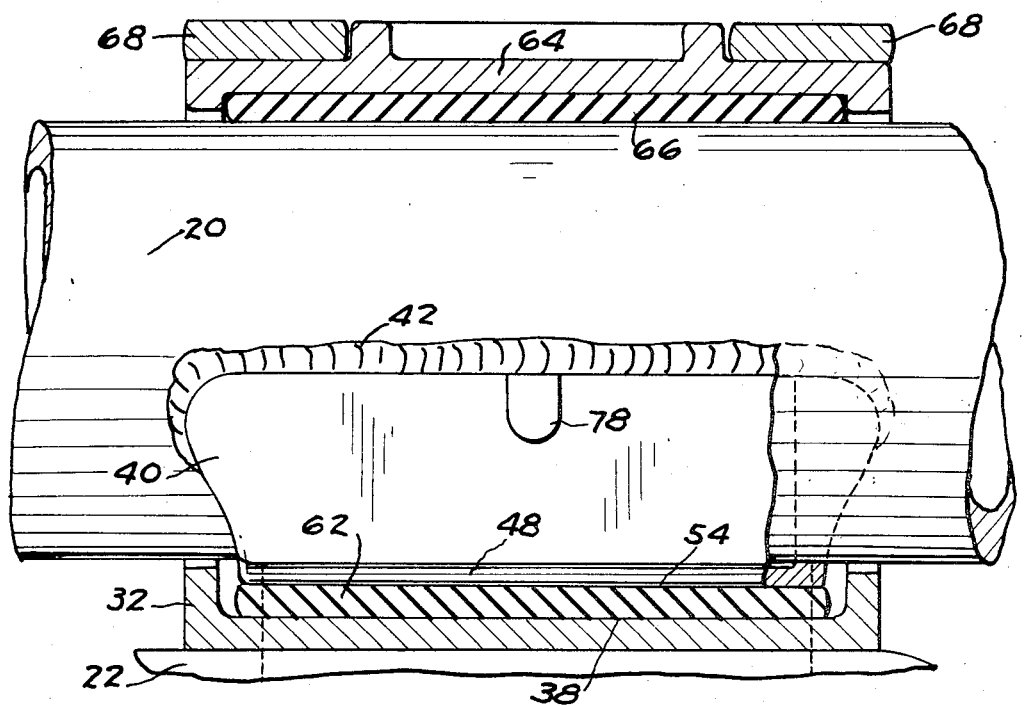
FIG. 3 is an enlarged scale vertical sectional view of the axle connection taken along the axis of the axle.

Shown in FIG. 1 is a vehicle 10 having a body 12 mounted on a frame 14 from which ground-engaging wheels 16 are suspended by a suspension 18 according to the present invention.

Selected for illustration of the invention is a suspension in which an axle 20 which carries wheels 16 is secured in load-bearing relation to frame 14 by a pair of control arms 22 pivotally mounted at 24 on depending frame brackets 26 at opposite sides of the vehicle frame. Axle 20 is secured adjacent its ends to control arms 22 by connections 28 incorporating the present invention. Air springs 30 are disposed in load-bearing relation between control arms 22 and frame 14.

Figure 4:
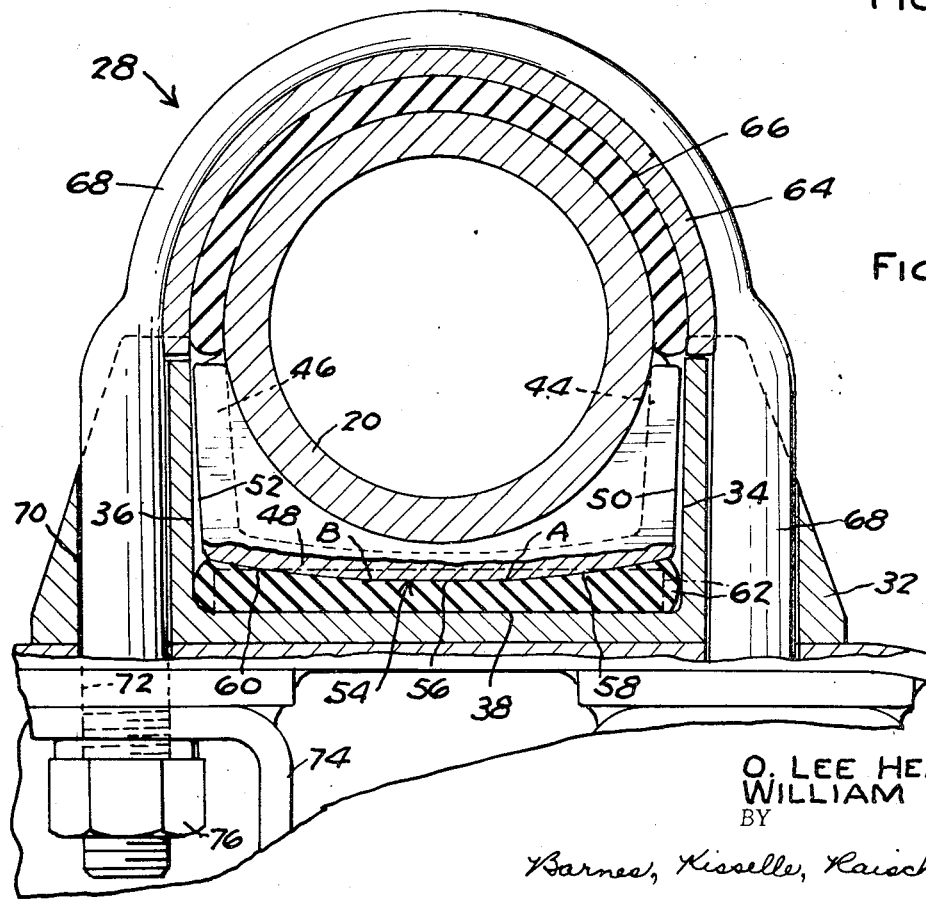
FIG. 4 is a transverse sectional view of the structure shown in FIG. 3.
Figure 5:
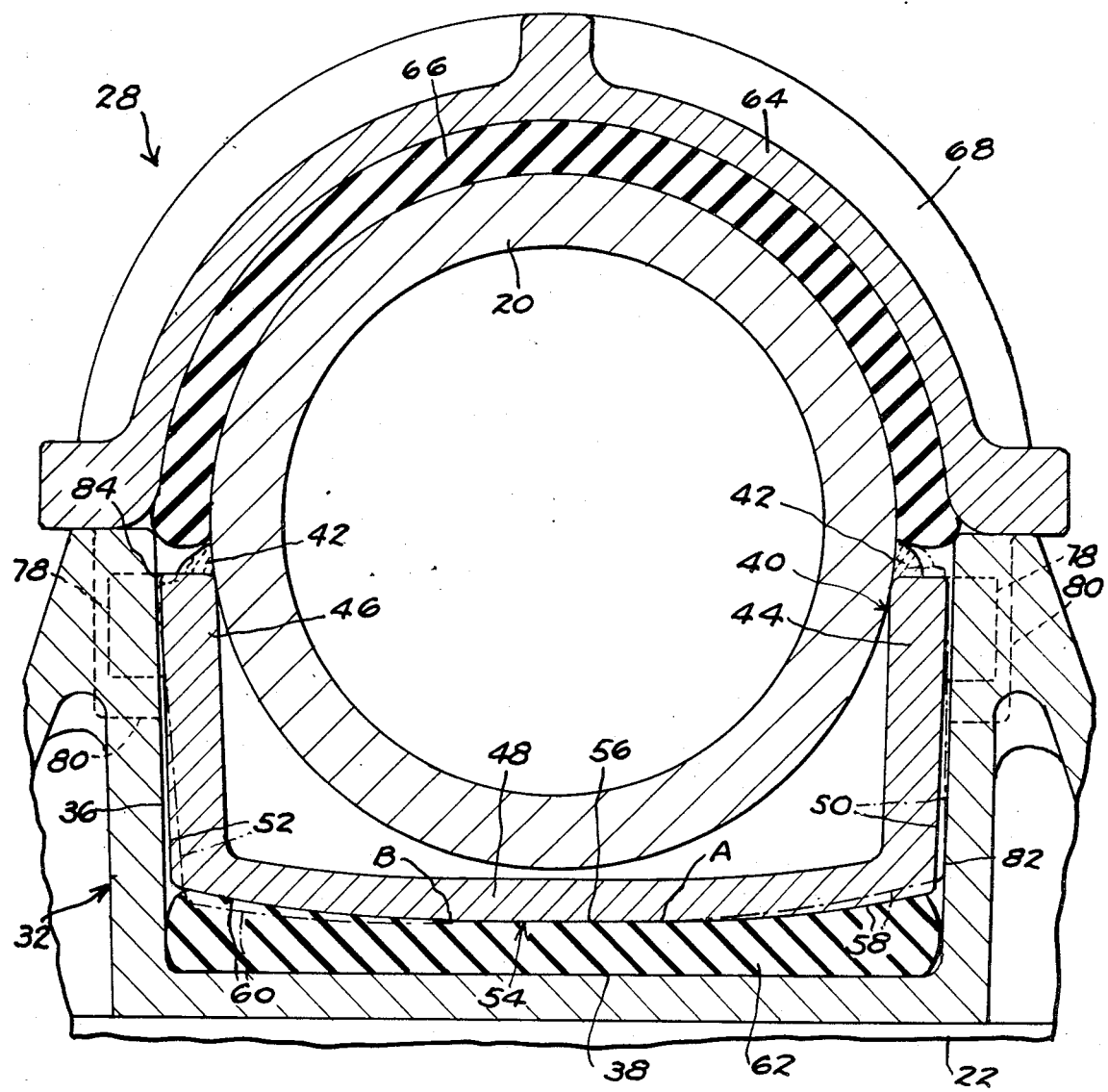
FIG. 5 is a further enlarged transverse sectional view of the axle connection.

Each axle connection 28 includes a saddle or receptacle 32 having internal sides 34, 36 and a bottom 38. An adaptor 40 is secured to axle 20 as by welding 42, and this adaptor has side walls 44, 46 and a bottom wall 48 disposed within receptacle 32. Walls 44, 46 respectively have outer surfaces 50, 52 apposed respectively to the sides 34, 36 of the receptacle. Clearance is provided between each pair of apposed side walls and these clearances may increase in a downward direction as shown in FIGS. 4 and 5.

End wall 48 has an end surface 54 which is disposed transversely of and non-concentric with respect to the axis of axle 20. End surface 54 faces and is spaced from bottom 38 of receptacle 32, as shown. In the illustrated structure, surface 54 has a flat central portion 56 and side portions 58, 60 which, progressing toward sides 50, 52, are curved upwardly away from bottom 38 of receptacle 32. Flat portion 56 extends between points A and B.

A body 62 of resiliently distortable material such as rubber, neoprene, or other elastomeric material is disposed between end surface 54 and receptacle bottom 38. A cap 64 surrounds but is spaced from the portion of axle 20 opposite from adaptor 40. A second body 66 of elastomer material is contained in the space between axle 20 and cap 64.

Receptacle 32, axle 20 with its adaptor 40, cap 64, and elastomer bodies 62, 66 are anchored on a control arm 22 by U-bolts 68. These U-bolts pass around the top of cap 64 and downwardly through an opening 70 in receptacle 32 and openings 72 in mounting brackets 74 forming portions of the control arm. U-bolts 68 are anchored to brackets 74 by nuts 76. When the U-bolts are drawn down, they cause cap 64 to stress upper elastomer body 66 in a radial direction around axle 20. Also, lower elastomer body 62 is stressed so that it distorts from the dotted-line condition of FIG. 4 to the solid-line condition wherein the central portion thereof underlying adaptor surface 56 is stressed to a greater extent than its side portions.

Adaptor 40 has outward projections 78 engaged within mating slots 80 in receptacle 32 to secure axle 20 and axle connection 28 in their proper relative positions longitudinal of the axle.

For convenience in terminology, receptacle surfaces 34, 36, adaptor surfaces 50, 52, 54, and receptacle bottom 38 may be regarded as having a length dimension which extends generally parallel to the axis of the axle 20.

In use, when control arms 22 are at the same vertical rotative position with respect to vehicle frame 14, axle 20 extends horizontally therebetween an adaptor 40 is in neutral position with respect to receptacle 32, as shown in FIG. 4 and in solid lines in FIG. 5. During operation of vehicle 10 whenever wheels 16 encounter unlike road surfaces such as bumps or depressions, one end of axle 22 is raised or lowered with respect to the other end, resulting in unlike vertical swinging movements of control arms 22.

The control arms pivot about their mounts 24 and tend to carry the axle in an arcuate path around the axis of the pivot. However, because of the unlike swinging movement, each control arm resists such arcuate movement of the axle by the other control arm, thereby stressing the axle in torsion. This torsional force is transmitted to adaptor 40 which rocks generally about the axis of axle 20 against the resilient support of stressed elastomer body 62. Thus, adaptor 40 rocks from the neutral solid-line position of FIG. 5 to the dotted-line position thereof. Left portion 60 of end surface 54 of the adaptor moves more closely to receptacle bottom 38 placing the left portion, as FIG. 5 is viewed, under greater stress. Flat central portion 56 of the adaptor end serves as a relieved area into which the elastomer material may flow to facilitate distortion of the elastomer body without exceeding its elastic limits.

If the torsion forces are great enough, the rocking movement continues until side surfaces 50 of the adaptor engages receptacle side 34 in metal-to-metal contact at a lower portion of the receptacle generally adjacent elastomer body 62. The region of interengagement is indicated generally at 82 in FIG. 5. Thereafter, if additional torsional force is exerted on adaptor 40, the adaptor and the end of the axle secured thereto move bodily to the left, as FIG. 5 is viewed, against the stress of elastomer body 66. Such movement continues until adaptor surface 52 engages receptacle surface 36 in metal-to-metal contact at a region generally indicated at 84. Thereupon, the adaptor and receptacle are locked against further relative movement under the torsional forces thereon.

When the torsional forces are relieved, the components return to the neutral position shown in FIG. 4 and shown in solid lines in FIG. 5. When torsional forces are exerted on the axle in the opposite direction, the behavior of the components is similar except that the axle and adaptor 40 rock in the opposite direction; and if the forces are great enough, lower portions of surfaces 36, 52 interengage and then upper portions of surfaces 34, 50 interengage in the manner described.

The curvature of adaptor surfaces 58, 60 results in elastomer body 62 having its greater thickness near its side edges where distortion of the elastomer body is greatest when adaptor 40 rocks. The percentage of distortion is thereby kept well below the point at which the material would fail. Moreover, the curved surfaces 58, 60 eliminate any corners which would dig into the elastomer material and cause a relatively great distortion in a localized area. Thus, the curved surfaces distribute the distorting forces over a maximum area. These factors substantially prolong the effective life of elastomer body 62.

Moreover, the bottoming out of the side surfaces 34, 50 and 36, 52 provides positive limits on the extent of distortion of elastomer body 62, thereby safeguarding against distortion beyond its elastic limits.

Up to the point where the adaptor and receptacle surfaces make metal-to-metal contact, the suspension is relatively flexible, being dependent primarily upon the spring rate of elastomer body 62. After the initial metal-to-metal contact as at region 82, the suspension becomes more rigid because of the greater effort required to distort upper elastomer body 66 in a radial direction. Upon the second metal-to-metal contact, as at region 84, the suspension becomes yet more rigid since all flexing thereafter is in the metal components of the suspension.

The graduation from relative flexibility to relative rigidity results in improved ride of vehicle 10 as well as improved roll resistance of the vehicle. In the latter regard, it is to be noted that axle attachments 28 function in the manner described when the vehicle tends to roll or tilt, for example, when rounding a corner, as well as when the control arms swing unevenly on the straightaway. As will be obvious from the structure and functioning described above, elastomer bodies 62, 66 yield to permit a certain amount of horizontal tilting of axle 20 within connections 28 relative to control arms 22 upon uneven swinging thereof or upon rolling movements of vehicle body 12.

The relief provided by flat portion 56 of adaptor surface 54 could be provided in other ways such as grooving or other relief contouring either of adaptor surface 54 or receptacle bottom 38. Moreover, while such relief is preferable, it is not in all cases necessary. We have found that it is possible to eliminate such relief and that the suspension will still function satisfactorily.

The clearances shown between surfaces 34, 50 and 36, 52 are somewhat exaggerated for purposes of illustration. While the invention is disclosed with respect to pivoted control arms 22 and the use of air springs 30, connection 28 could be utilized to secure an axle 20 to other suspension components such as a leaf spring stack or a walking beam. Axle connection 28 is equally effective in absorbing torsional forces other than those described above such as brake torque or driving torque, should wheels 16 be mounted on a driven axle. While in the structure illustrated receptacle 32 and adaptor 40 are mounted beneath axle 20, the structure could be inverted so that these components are mounted above axle 20, and the structure would function in the manner described above.

We claim

1. Suspension structure for a land vehicle which comprises, an axle adapted to carry ground-engaging wheels, mounting means mounted on said axle and being adapted to secure said axle in load-bearing relation to a vehicle, said axle including means providing a first surface which extends transversely of and nonconcentric to the axis of said axle, said mounting means including means providing a second surface in proximity to but spaced from said first surface, said axle and mounting means being relatively rockable, a body of elastomeric material in the space between said surfaces effective to resist said relative rocking, said first surface having side portions and a central portion closer to said second surface than said side portions, said material being stressed to a greater extent adjacent said central portion than adjacent said side portions in relative neutral position of said axle and mounting means, said second surface having a central portion which extends generally parallel to said central portion of said first surface, one of said central portions being relieved to provide space into which said material can flow upon said relative rocking movement.

2. The structure defined in claim 1 wherein said central portion of said first surface is so relieved.

3. The structure defined in claim 2 wherein said first surface is curved between said side portions and central portion, said central portion of said first surface having a flat portion which provides the relief therein.

4. The structure defined in claim 3 wherein said second surface is substantially flat.

5. Suspension structure for a land vehicle which comprises, an axle adapted to carry ground-engaging wheels, mounting means mounted on said axle and being adapted to secure said axle in load-bearing relation to a vehicle, said axle including means providing a first surface which extends transversely of and nonconcentric to the axis of said axle, said mounting means including means providing a second surface in proximity to but spaced from said first surface, said axle and mounting means being relatively rockable, resilient means in the space between said surfaces effective to resist said relative rocking, said first surface having side portions and a central portion closer to said second surface than said side portions, said resilient means being stressed to a greater extent adjacent said central portion than adjacent said side portions in relative neutral position of said axle and mounting means, said mounting means including means defining a receptacle having sides and having a bottom which forms said second surface, said axle including means defining a lateral projection having sides which fit with clearance between the receptacle sides and having an end defining said first surface, said sides having lengths which extend generally parallel to said axis, each projection side being apposed to one of said receptacle sides, apposed ones of said sides being interengageable responsive to relative rocking movement of said axle and mounting means about said axis under the influence of force exceeding the resistance of said resilient means.

6. The structure defined in claim 5 wherein said resilient means comprises a body of elastomeric material, said mounting means including a cap secured to said receptacle and surrounding a portion of said axle opposite to that of said projection, said cap and axle portion being spaced apart and containing therebetween a second body of stressed elastomeric material, said axle and projection being bodily movable against the stress of said second elastomeric body responsive to additional force after said apposed ones have so interengaged, the other apposed ones of said sides being interengageable under the influence of force exceeding the combined resistance of said elastomeric bodies.

7. The structure defined in claim 6 wherein the region of the first said interengagement is disposed relatively closely to said projection end and the region of the second said interengagement is disposed relatively distant from said projection end.

8. The structure defined in claim 1 wherein said mounting means comprises a pair of control arms mounted adjacent opposite end portions of said axle and being adapted to be secured for vertical swinging movement to opposite sides of a vehicle frame, and spring means associated with said control arms adapted to be secured in load-bearing relation to the vehicle frame.

9. The structure defined in claim 8 wherein said spring means comprises a plurality of air springs.

10. In combination, a land vehicle and the structure defined in claim 1 secured thereto.

* * * * *